March 4, 1958     H. E. ROWEN     2,825,550
WIND BOX SEALING CONSTRUCTION FOR SINTERING MACHINES
Filed Dec. 6, 1955     4 Sheets-Sheet 1

INVENTOR.
HAROLD E. ROWEN

March 4, 1958  H. E. ROWEN  2,825,550
WIND BOX SEALING CONSTRUCTION FOR SINTERING MACHINES
Filed Dec. 6, 1955  4 Sheets-Sheet 2
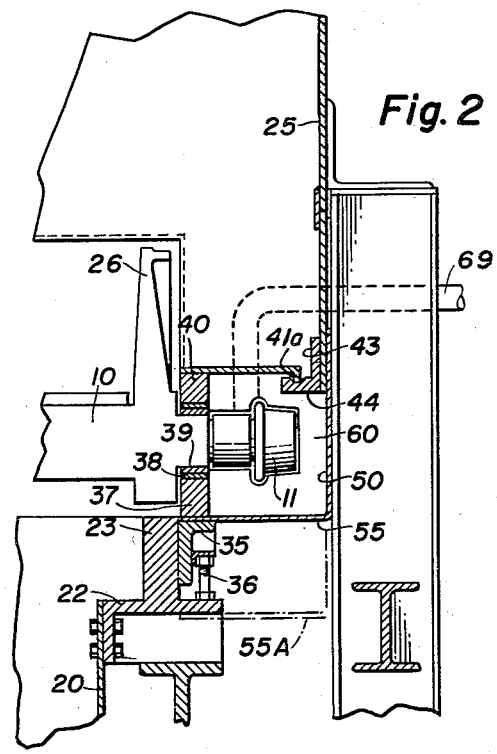
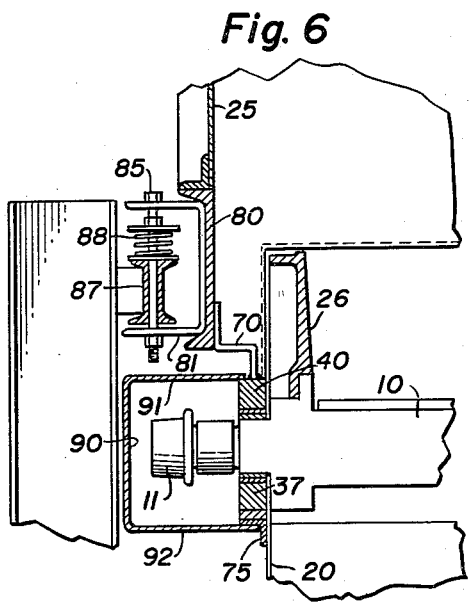
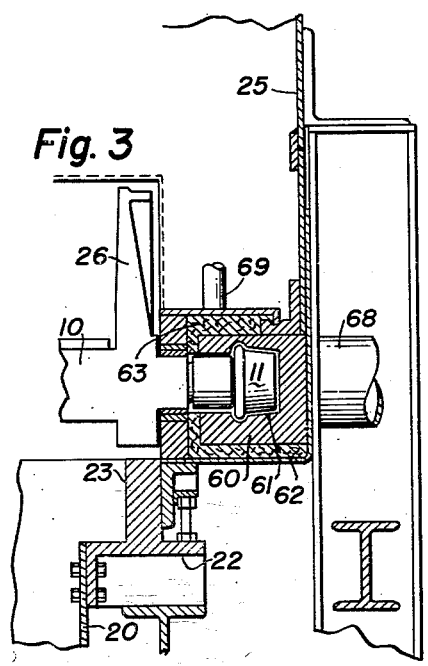
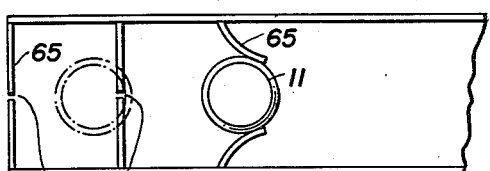
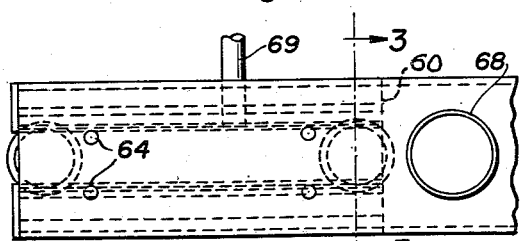
INVENTOR.
HAROLD E. ROWEN
BY
ATTY

INVENTOR.
HAROLD E. ROWEN

March 4, 1958 H. E. ROWEN 2,825,550
WIND BOX SEALING CONSTRUCTION FOR SINTERING MACHINES
Filed Dec. 6, 1955 4 Sheets-Sheet 4
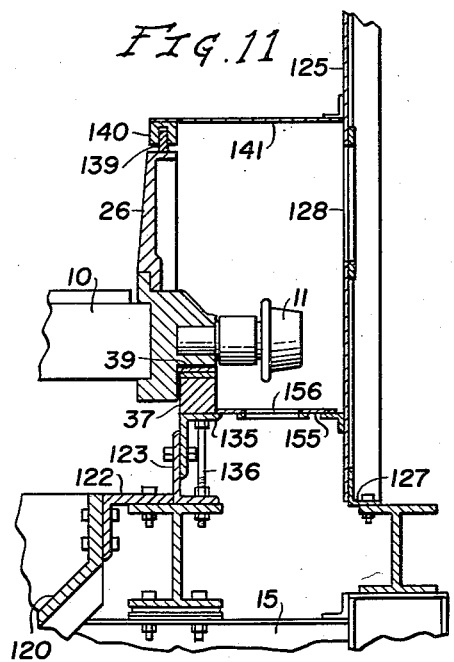
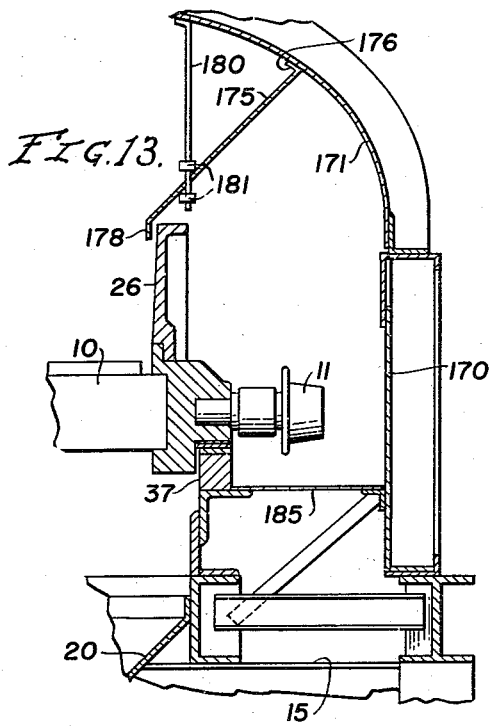
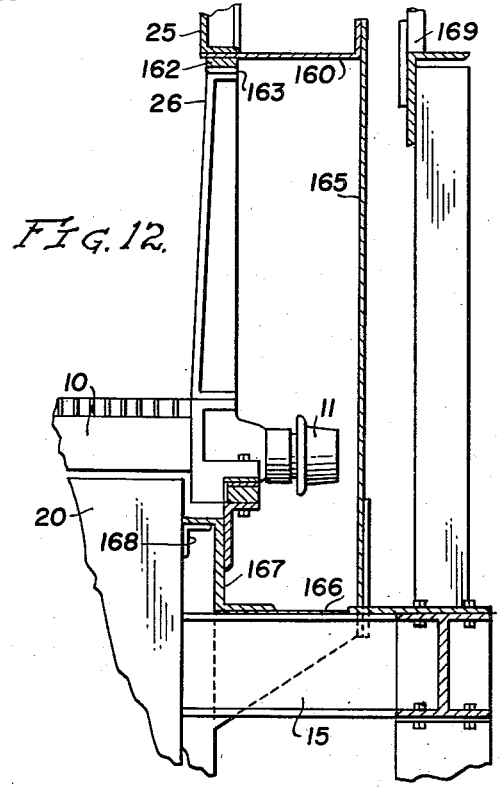
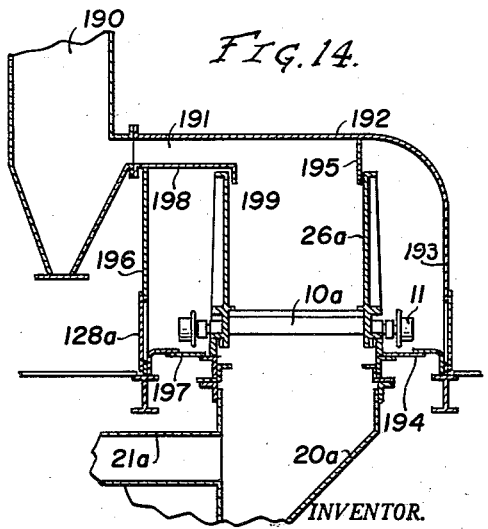
INVENTOR.
HAROLD E. ROWEN,
BY
Justin W. Macklin,
ATT'Y

United States Patent Office 2,825,550
Patented Mar. 4, 1958

2,825,550

WIND BOX SEALING CONSTRUCTION FOR SINTERING MACHINES

Harold E. Rowen, Lakewood, Ohio, assignor to McDowell Company, Inc., Cleveland, Ohio, a corporation of Ohio Application December 6, 1955, Serial No. 551,245

19 Claims. (Cl. 266—21)

The present invention relates to improvements in means for forming connections between an upper wind box or hood and a lower wind box of a sintering machine, so arranged as to permit the pallets and wheel assemblies to travel in a path between the hood and wind box.

Machines of this character are used not only for sintering of ore concentrates and the like, but have many analogous uses including calcining, pellet burning, heat treating, roasting etc. For convenience, it is referred to as a sintering machine.

More particularly, my invention relates to an improvement upon and addition to the construction shown, described and claimed in my prior patent application, Serial No. 484,095, filed January 26, 1955, entitled, "Wind Box Seal for Sintering Machines." In that application as in the present one, the general object was to provide a simple, efficient, durable means for preventing leakage and loss of air or gas pressure or suction at the relatively moving closure elements forming the seal between the pallets and the adjacent edges of the upper hood and of the wind box and along the supports for the pallets.

In my prior application above identified, the general object attained by the structure there disclosed was the provision of an effective seal which was not exposed to undue heat, which maintained its effectiveness in prolonged use, and in which the hood or upper wind box rested upon moving pallet seal bars with a controlled reduced pressure on the bars, substantially less than the weight of the hood structure. Alternatively, increased pressure on the pallet seal bars could be provided, if desired.

The present sealing apparatus may be considered to be designed for use on sintering machines such as the Dwight-Lloyd type. In the use of such apparatus, the structure disclosed in my prior application, above identified, may, under some conditions of operation, require an additional provision for more effectively preventing ingress or egress of air or gases at the coacting sealing surfaces which lie between the upper and lower seal bars of the pallets.

In carrying out the present invention, I provide a closed tunnel-like chamber coextensive with the longitudinal extent of the wind box and hood sealing means. This chamber or tunnel forms an additional enclosure embracing the longitudinally extending sealing means and pallet supporting wheels, and in which tunnel-like space, air or gas movement into or from the end portions is prevented while permitting the wheels to pass into and from them. By this arrangement, I am enabled to create either positive or negative air or gas pressure within the sealing chamber, to any degree having the desired relation to that obtaining within the tunnel-like sealing chamber.

For simplicity, this chamber is frequently hereinafter referred to only as a "tunnel."

The tunnel may be kept under pressure or vacuum as required to control objectionable leakage, or it may be filled with selected gases.

Stated another way, an important objective is to provide a substantially gas or airtight connection between the upper and lower wind boxes, which permits the pallets and their wheel assemblies to travel along the machine between the wind boxes without loss of either positive or negative pressure of the air or gases being used.

Preferred embodiments of my present invention, constituting additions to and improvements upon previous sealing means used in the Dwight-Lloyd type of sintering machines, and particularly such sealing means as are disclosed in my aforementioned prior application, are illustrated in the accompanying drawings, in which:

Fig. 2 is a transverse section on a somewhat enlarged scale illustrating in detail the tunnel at one side of the machine surrounding the pallet wheels, and showing the connections to the lower box structure and the closure connections with the upper box or hood;

Fig. 3 is a similar transverse section illustrating a wheel-embracing passage and closure means at the entrance to or exit from the sealing tunnel;

Fig. 4 is a side elevation of the tunnel and entrance sealing wheel-embracing portion;

Fig. 5 is a longitudinal section of the tunnel entrance showing a modification of the wheel engaging and sealing means;

Fig. 6 is a sectional view of an adjustable hood supporting structure and modified form of tunnel seal;

Fig. 11 is a fragmentary sectional view similar to Fig. 2, showing a modification of the tunnel-forming structure in which the upper seal is formed at the upper edges of the pallet side walls;

Fig. 12 is a further modification of this tunnel arrangement with coacting sliding seal bars at the top of the pallet side walls;

Fig. 13 is a similar view showing a modification of the upper hood wind box and in which the top wall of the tunnel is in the nature of a sloping seal-shield extending inside the pallet side walls; and Fig. 14 is a composite view of a section through a pallet, tunnels at each side and connecting passages to upper and lower wind boxes.

Figure 1:
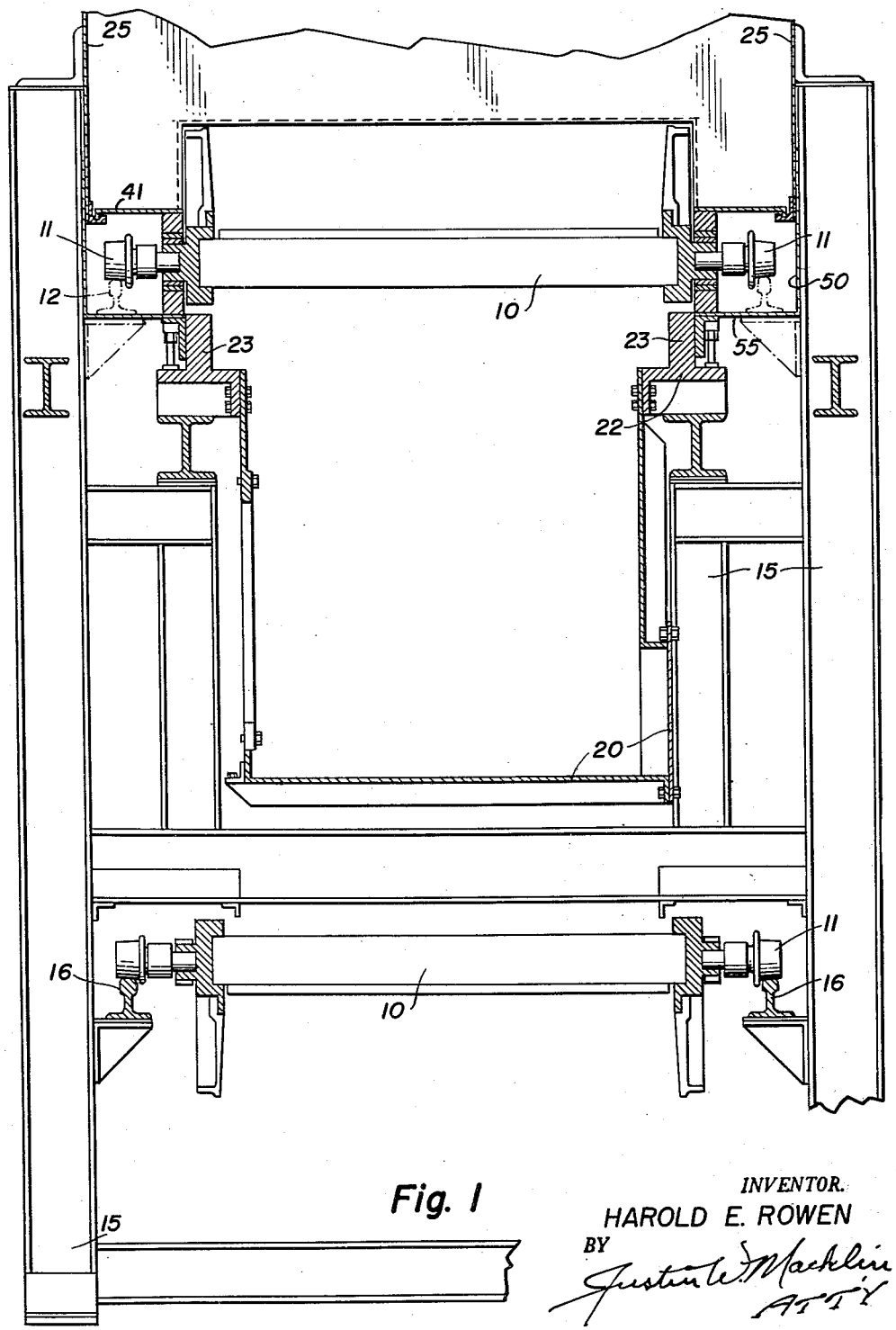
Fig. 1 is a vertical section through a sintering machine, taken on a plane transverse to the path of the pallets and showing a portion of a hood or upper wind box, the lower wind box with my connecting sealing means, and also showing the pallets and trackways therefor.
Figure 7:
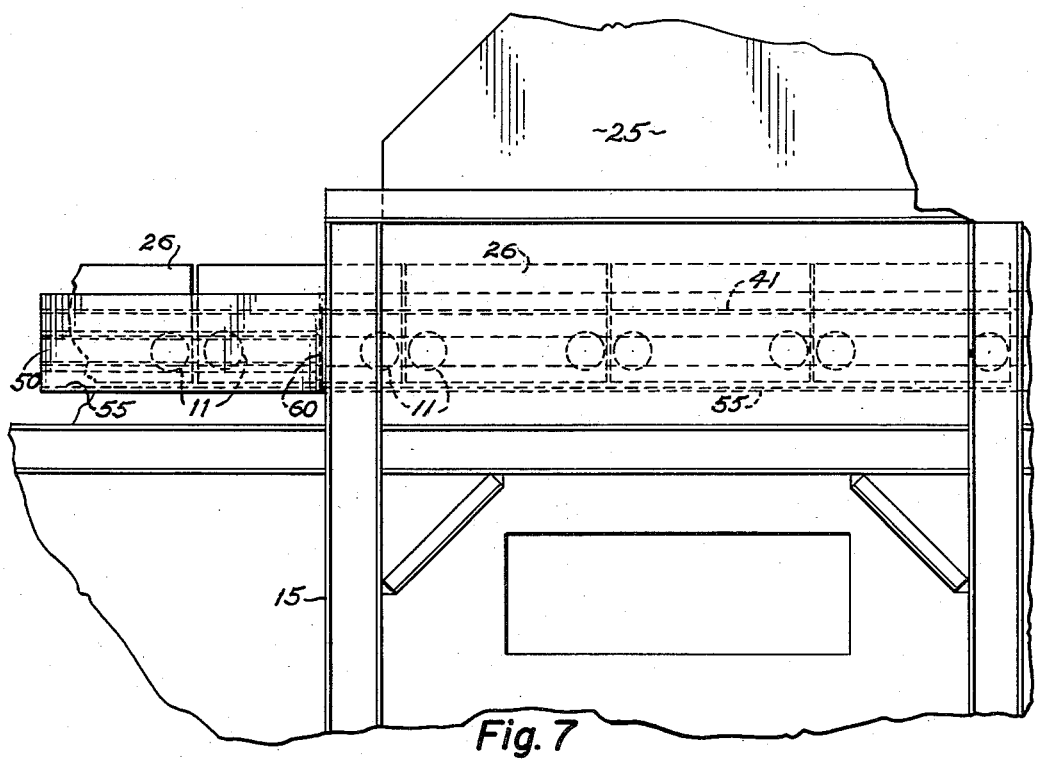
Fig. 7 is a fragmentary side elevation showing a portion of the upper and lower wind boxes and pallets passing therebetween with the pallet wheels moving into the sealing tunnel.

The cross section view of Fig. 1 illustrates the frame and traveling pallets of a sintering machine such as that to which my invention may be particularly well adapted.

One embodiment of my invention is illustrated in Figs. 1 to 4. The traveling pallets or receptacles designated 10 are adapted to move in end-to-end relation along a horizontal path, supported (except as will hereinafter appear) by their wheels 11 on rails 12. The rails are, in turn, carried by a frame structure designated generally 15, and which includes suitable vertical and horizontal structural members.

Rails 16, appearing in Fig. 1, provide a lower reach or return path for the pallets. The arrangement and function of the structure comprising the present invention is concerned only with the sealing means along the path of the pallets in which they move in contacting succession during the sintering operation. While it is customary in such machines to provide for returning these pallets along a lower reach beneath the sintering path, it is to be understood that other methods may be used for transporting the pallets from the end of the active or sintering path to starting position or "driving end" at the beginning of this path. Accordingly, my present invention is not limited to the pallet return structure, as will clearly appear from the following description.

Below the sintering path of the pallets, a lower wind box, designated 20, is here shown as having its side plates secured to and supported by longitudinally extending frame members 22 having upwardly extending flanges 23 onto which are fitted sealing elements, as will be described. The upper wind box or hood, only partially shown, may have its side wall portions 25 supported outside of the grate members to structural parts of the frame.

Both the hood and lower wind box are connected with coacting relatively sliding bars for the purpose of effecting a seal at the sides of the pallets. Various forms of such arrangements have been used heretofore, but difficulties have been encountered in effectively sealing the positive and negative pressures within the wind boxes.

Some of the former difficulties have been overcome by the construction disclosed in my aforementioned prior application. Inasmuch as that structure lends itself to the adaptation of the improvements of the present invention, the drawings hereof include the related features of that earlier application. It is to be understood, however, that various forms of sealing devices between wind boxes and moving sintering grate pallets may be effectively supplemented, and their operation greatly improved, by my present invention. It follows that the present invention is not intended to be limited to any precise form of sealing means between the pallets and wind boxes. The supplemental tunnel sealing and pressure maintenance of the present invention may be used with a lower wind box, with a hood or upper wind box, or, as in the embodiments herein illustrated, may connect and cooperate with both of them.

In the apparatus herein shown, the pallets 10 comprise transverse horizontal grates and the usual material retaining side walls 26, outside of which are longitudinal side ribs forming supporting and guiding surfaces and wheel hub carrying members.

Between the frame flanges 23, which are connected with the upper portions of the side walls of the lower wind box 20, and the pallets are vertically adjustable longitudinal angle bar members 35. Vertical adjustment of these bars may be effected by adjusting screws indicated at 36, it being assumed that the angle bars 35 are secured by bolts or screws extending through elongated or enlarged openings.

Carried by the longitudinal members 35 are seal bars 37 having wear strips 38 on their upper faces, coacting with similar wear strips 39 carried by the pallets. Similar wear strips on the pallets and seal bars 40, extending the length of the hood, may effect a sliding seal as do the strips 38 and 39.

Secured to and extending laterally from the bar 40 is a connector plate 41a extending the full length of the hood and laterally to a flanged angle member 43 having a longitudinally extending groove in the upper side of an inwardly projecting flange portion thereof. This groove receives a downturned flange 44 on the edge of the plate 41. This plate thus spans and closes the space between the hood wall 25 and the seal bar 40.

The arrangement just described in connection with Fig. 2 corresponds to one form disclosed in my aforesaid prior application. However, as indicated in the foregoing objects, it is desirable to provide further assurance against leakage either to or from the wind boxes, for example, to prevent any leakage of injurious gases incident to sintering or roasting processes, or to prevent dilution of gases being used in the operation of the apparatus by leakage of air into the hood or wind box.

Again, as indicated above, the present invention provides a means outside of the sealing bar and sliding strip connections, and outside of the pallet wheels which may form a gas-tight connection between the hood and lower wind box. Such a tunnel-like housing extends along the longitudinal distance of the upper and lower wind boxes and preferably somewhat beyond them at its ends.

The particular sealing means between the pallets and the wind boxes may be of any suitable construction. However, for the purposes of the present invention, some such sealing means are used to assure that the processing air or gas streams pass through the material being sintered, or otherwise treated.

From inspection of Fig. 2, it will appear that the bridging plate 41 and the sealing bars and wear strips form the top and one side of a sealing tunnel. The other vertical side and bottom of the tunnel may be formed of a longitudinally extending plate having a vertical portion 50 extending downwardly from the side plate 25 of the hood, and then inwardly as at 55. The inner edge of the plate 55 may extend beneath the seal bar 37 between it and the adjustable angle bar 35. Sufficient flexibility of the material of the plate portion 50 and 55 permits the vertical adjustment of the lower seal bar and supporting angle member 35.

It will be seen that this plate member forms a tight sealing closure connection extending from the side plates of the hood to the sealing means connected with the side plate 20 of the lower wind box while surrounding the path of the wheels.

As a slight modification of the sealing plate 50 and 55, its lower horizontal portion may, if desired, be positioned to extend over the horizontal shoulder of the structural member 22. This position is indicated in broken lines at 55A. The rails 12, normally supporting the pallets in their upper path, may be discontinued through the longitudinal extent of the tunnel, inasmuch as the pallets are here supported on the seal bar 37 and wear strips 38 and 39, along that portion of the path between the hood and wind box.

The wear strips between the pallet and the seal bar 37 are suitably lubricated, preferably by a lubricant metering and supplying means such as described in my aforesaid prior application.

The component parts of the tunnel assembly just described may be of metal, heat resistant woven materials, or other compounded materials which have sufficient flexibility to allow the small, relatively vertical movements for adjusting the wear strips 38 and 39.

It will be seen that the portions 50 and 55 of the tunnel form, in effect, extensions of the side plates of the hood outside of and below the wheels, whereby an effective non-sliding seal is completed between the hood and the lower wind box. Thus, for example, assuming that the ends of the tunnel are closed, if air or gas is passing upwardly through the grates under either positive or negative pressure, there would be no leakage between the top of the lower wind box and the bottom of the hood. Passage of air or gas in the downward direction likewise is assured to be entirely through the grates by reason of the top tunnel plate members 41 and sliding seal connections between the grates and the hood and wind box.

Obviously, unless prevented, considerable leakage would occur at the ends of the tunnel. Accordingly, I provide a closure means at the ends of the tunnel coacting with the wheels 11 so that they may move into and out of the tunnel while free flow or any appreciable leakage is precluded.

In the forms shown in Figs. 2, 3, and 4, the end portions of the tunnel are each fitted with a longitudinally extending block or lining member 60, preferably of metal, and having a longitudinal passage therethrough, open at one side and shaped, as indicated at 61, to conform to the contour of the flanged wheels 11 and their hubs.

Yieldable or flexible packing material may be fitted above and below the member 60, as indicated at 62 and 63. The resiliency of this sealing packing permits limited relative movement between the sealing strips and the member 60. At 64 (Fig. 4) are indicated openings for screws for holding the member 60 against longitudinal displacement while permitting a slight vertical adjustment.

As shown in this cross-sectional Fig. 3, the rails 12 are omitted within the tunnel, although obviously the liner member and packing may be fitted around the rails if it were found desirable to extend them through the tunnel space. The length of the liner member 60 is such that it will always embrace two or more pallet wheels, as indicated in the side elevation, thus further inhibiting any leakage or flow past the wheels, which obviously must not fit too closely in the space formed in the member 60 and through which they pass.

Other means for sealing the ends of the tunnel may be used, such, for example, as may constitute divided flexible flaps 65, Fig. 5, extending inwardly from the top and bottom walls, arranged in pairs and spaced apart longitudinally, and normally meeting at their edges as indicated at 65A, except when flexed by passing of the wheel 11 therebetween.

To further effect a substantially perfect control or balance of positive or negative pressure as between the interior of the tunnel and the wind boxes, I may provide one or more pipe connections intermediate of its end closures, as indicated at 68, leading to a suitable fan or blower, not shown, which may either draw air or gas from the tunnel, or pump air or gas into it to balance the pressures at the pallets and between the upper and lower hoods. A smaller pipe 69 may lead to the space 61 in each of the end closures 60. A positive pressure or a negative pressure, as may be suited to the conditions within the hood and wind box, may be thus maintained within the tunnel.

From the foregoing it will be seen that I have provided a longitudinally extending sealing chamber bridging the normal sealing means for either of one or both of the upper and lower wind boxes, and in which chamber a positive or negative air or gas pressure having the desired relation to concurrent pressures within the wind box or hood may be maintained. Thus, the sintering or analogous operation of the apparatus is most effectively protected against air or gas leakage.

In the tunnel structure so far described, the sealing hood was assumed to be rigidly fixed to the frame. However, as is disclosed in my prior application, the weight of the hood may be partially carried on the seal bars and may be adjustably balanced to relieve the pressure and consequent friction and wear on the relatively movable sealing strips.

In Fig. 6 I have illustrated a tunnel structure attached to a hood mounting and supporting structure corresponding to that shown in my prior application.

Referring to the structure shown in Fig. 6, it will be noted that the upper seal bar 40 is attached to an offset or Z bar 70, sealed to and rigid with a longitudinal lower channel structure 80 fitted to the lower edge of the side plate 25 of the hood. Fixed on the channel 80 are laterally extending bracket arms 81 through which a vertical rod 85 is passed, and which is slidable through a bracket 87 fixed to a vertical member of the frame of the machine. A spring 88 is so mounted as to have its tension adjusted to control the amount of weight permitted to be taken by the seal bars and its wear strips, as the pallets move along them.

The offset connecting member 70 permits the hood side walls to be spaced away from the heat and direct flames in the material carried by the pallets. The lower wind box is here shown as having its upper edge attached to an angle strip 75 on which the lower seal bar 37 is carried.

The tunnel of Fig. 6 may comprise a substantially rectangular member 90 having its inturned horizontal walls 91 and 92 secured to the seal bar 40 and angle strip 75 in an airtight manner, as by welding, for example.

It is to be understood that in the constructing and assembling of all such parts, I do not wish to be limited to the manner of securing them together, whether by bolts, welding, or otherwise.

It will be seen that the shape and size of the substantially rectangular tunnel, the inner side of which is formed by the pallet sealing bars and strips, is such as to permit the free passage of the wheels therethrough, and its ends may be closed by members fitting the contour of the wheels and hubs, as previously described.

If the rails are continued through the tunnel space, either the lower transverse wall forming member of the tunnel may be so positioned as to extend below rail supporting brackets 98, indicated in broken lines 55A in Fig. 2, or the rails may rest on the transverse portion 55 above these brackets, provision being made for desired flexibility of the inner edge of the transverse member 55. In practice, however, it is found unnecessary to extend the rails through the sealing tunnel.

It is desirable that the upper and lower sides of the tunnel and their points of attachment to the hood and wind box structure be self-supporting and yet be flexible to some extent, and in this connection it is obvious that various formations of the walls of the tunnel may be utilized. Such contours as that formed by the portions 50 and 55, for example, may be modified as indicated by the diagrammatic detail Figs. 8, 9, and 10.

Figure 8:
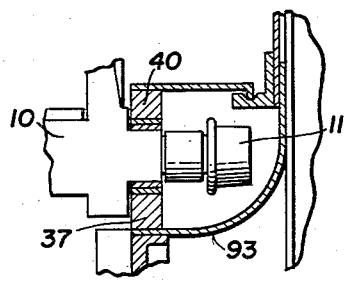
Figs. 8, 9 and 10 are detail sections illustrating modifications of the tunnel structure.
Figure 9:
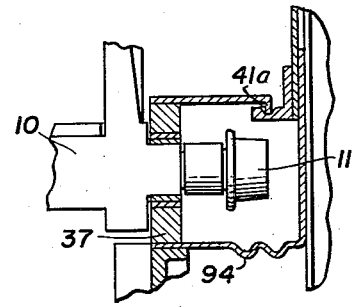
Figure 10:
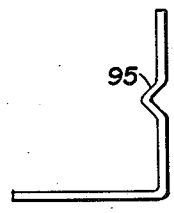

In Fig. 8 the plate 93 is curved as shown; in Fig. 9 the plate 94 may have reverse bends; and in Fig. 10 a single offset 95 may lend the needed flexibility to the plate.

Obviously, many other formations may perform the functions essential to the objectives herein set forth. For example, modifications of tunnel structures are further illustrated in Figs. 11 to 14, inclusive. The arrangement shown in Fig. 11 indicates a lower wind box 120, the connection to the seal bar corresponding somewhat to the arrangement of Fig. 2, there being an outwardly extending flange 122 and an upwardly extending flange 123, shown as forming a part of an angle member, and to which another angle member 135 is so bolted or secured as to be vertically adjustable by screws 136 corresponding to the screws 36 of Fig. 2.

The pallet 10, wheels 11, and seal bar construction may be assumed to be arranged as before. However, in lieu of the upper seal bar and wear strips arranged adjacent the wheel hubs of the pallets, the top seal plate of the tunnel shown at 141 is secured to the side wall 125 of the hood, and projects inwardly and is of such material and thickness as to be somewhat flexible. A sealing contact bar 140 is fixed to this plate and adapted to carry a sealing strip 139, shown as set into a groove in the bar 140, and as having its lower edge contacting the outwardly turned flange portions formed on the side wall members of the pallets.

The vertical wall of the upper hood 125 extends downwardly and is suitably supported and secured as at 127 to a longitudinal structural member of the frame of the machine. The lower seal plate 155 may be transversely adjustably secured to an angle bar fixed on the side plate member 125, while its other edge is in sealed contact with the flange of the angle member 135.

At 156 is indicated a clean-out opening through the plate 155. Any desired number of such openings may be provided, each, of course, having a suitable closure. Access openings, such as shown at 128, may be formed through the wall member 125 and spaced at convenient intervals.

Obviously, access openings through the side walls, and "clean-out" openings through the bottom walls of the tunnels may be provided in all of the structures herein shown and described, being located where needed, and, of course, fitted with removable closures, which in all instances would be arranged to effect a substantially airtight seal when in closed position.

In Fig. 12 a modification is illustrated in which the wall of the wind box is in vertical alignment with the side walls of the pallets. Thus, a modified form of seal is adopted. The structure shown includes the top wall plate 160 extending beneath a flange at the lower edge of the wind box, and it is understood that it is sealed thereto.

A seal bar 162 is fixed to the inner edge of the wall plate 160, while wear strip sections indicated at 163 slidably contact the seal bar 162 and are carried on the upper faces of flange portions of the pallet side walls.

A vertical plate 165 extends downwardly past the wheels 11, and the lower seal bar and wear strips, and is connected in an airtight fashion with the wind box 20. The lower wall plate 166 is shown as extending beneath an outwardly turned flange of a Z-bar 167 mounted on the frame and connected to the wind box, and having an upper horizontal flange connected to the lower wind box by an angle strip indicated at 168.

The adjustable mounting for the upper hood may be provided through connections, not shown. Such supporting means, connected with the hood, may have adjusting screws such as indicated as resting at 169 on a longitudinally extending member rigid with the frame 15.

In Fig. 13 is shown an arrangement with an arched type of hood, the outer walls of which extend downwardly outside of the wheels of the pallets. Here, a vertical side wall portion 170, mounted on a supporting structure carried by the frame, and above which and sealed thereto is an arched portion 171 extending longitudinally of the sintering path of the pallets, and instead of the upper sealing plates of the tunnel structure, such as 41 or 141, I may use a shield in the nature of a sloping plate 175, secured at its outer upper edge to the hood as at 176, and extending inwardly and downwardly and provided with a flange portion 178, which is positioned to contact with, or at least extend downwardly within, the upper inside edges of the side walls 26 of the pallets. When desired, this flange 178 may carry a heat-resistant sealing strip, not shown.

The material and thickness of the longitudinally extending sloping shield 175 is such that it may be sprung or bent slightly to permit adjustment, bringing the downturned flange 178 into the desired close relationship to the pallet side walls.

Such a slight change of angle of the plate may be effected by an adjusting means comprising a rod 180 extending loosely through an opening in the plate, and having a threaded portion receiving nuts 181 above and below the plate.

The lower seal plate 185 is preferably connected in an tight manner to the wall 170 and to the lower seal bar 37, effecting the seal for the lower wind box indicated at 20. Thus, a substantially airtight tunnel structure is provided. An advantage of so positioning the seal-shield plate 175 as to slope sharply downwardly and inwardly toward the pallets, is that of preventing accumulation of material on top of this sloping plate.

In the composite arrangement of Fig. 14, I have shown adaptations of the tunnel seal at opposite sides of the pallets and illustrative connections to the hood and lower or main wind box. In this view the pallets 10a are narrow, with relatively high side walls 26a. The lower wind box 20a is shown as having a laterally extending pipe 21a for leading air or gas to or from the wind box. The seal connections to the lower wind box may correspond to those previously described, and there may, of course, be a number of such wind boxes and pipes or conduits, as required for the operation of the machine. The air or gases may be brought to or from the upper sides of the pallets through a manifold-like conduit 190 connected at 191 with the roof 192 of a hood having a downwardly extending portion 193 extending over one side of the path of the pallets to the outside of the wheels 11, and suitably connected by a bottom seal plate structure indicated at 194.

The upper portion of this tunnel space may be closed by a vertical depending plate-like member 195 secured to the upper wall 192 and extending inside walls of the pallets 26a, and, of course, extending along a distance of a number of pallets—depending upon the length of the hood section.

At the other side of the path of the pallets, a vertical wall 196 is connected with the lower seal bar by a horizontal plate structure 197, while a top plate 198 extends over the top of the adjacent side wall of the pallets, and is provided with a downturned flange 199, as shown.

Access openings, such as 128a, should be provided in the vertical walls at suitable positions.

From the foregoing description it will be seen that in any and all of the several modifications shown, I have provided novel, inexpensive, durable and effective means for connecting the upper and lower wind boxes around the path of the moving pallets. In the construction illustrated, for example, in Figs. 1 to 12, the tunnel is sealed with relation to the moving pallets in a substantially air or gas-tight manner. In the arrangements illustrated in Figs. 13 and 14, the seal between the pallets and the lower wind box is airtight, and the seals at the upper inner edges of the pallet side walls may be effective for many uses, constituting a closure at the upper portion of longitudinally extending tunnels.

In all instances, loose and floating particles of material are prevented from coming into contact with the wheels and lower seal bars.

The seal bars and wear strips prevent shunting of air of gases around the sides of the pallets and thus assure the passage of the air or gases through the material on the grates of the pallets. The sealing tunnel, having its ends arranged to be closed while permitting the passage of the pallet wheels into and from the tunnel chamber, provides for establishing the controlled or balancing pressure within the tunnel, most effectively avoiding escape of gases which may be injurious, as well as avoiding consequent loss of efficiency of the sintering or roasting operation.

Adjustments and repair or replacements of the usual wear strips may be made without added inconvenience. The physical operations of the apparatus are in no way impaired.

As heretofore indicated, various other modifications of the structures of my combined primary and secondary sealing means may be made without departing from the intended scope of my invention as defined in the appended claims.

Having thus described my invention, what I claim is:

1. A sintering machine having pallets, means to pass said pallets in a path in contacting succession, each of said pallets having at each side a seal bar and supporting means; a wind box hood above said pallets having side walls extending downwardly outside of said pallets and along the path thereof, an airtight connection between said seal bar and said side walls, and an airtight tunnel-like chamber forming wall extending along and connected with each side wall of the wind box and having a sliding airtight connection with said pallets.

2. In a sintering machine having pallets, means for supporting and moving the pallets in a plane in contacting succession, longitudinally extending coacting sealing means comprising contacting surfaces on each side of each pallet and on the supporting means, means for directing a gas stream through the pallets, including a hood having side walls extending longitudinally along the path of movement of the pallets and outside of the pallets, and means forming an elongated chamber outside of said sealing means extending along said hood and having longitudinal wall portions connected in an airtight manner with said hood and with longitudinally extending sealing means.

3. A sintering machine including a movable succession of receptacles, means for supporting the receptacles and for moving them, a wind box hood supported to extend over the receptacles from side to side and above and longitudinally thereof, means effecting a sealing engagement cooperatively between the hood and the receptacles to resist the flow of gases from the hood between it and the sides of the receptacles, a lower wind box connected to the supporting means and in registration with the first-named wind box and sealed against ingress and egress of gas between it and the moving receptacles, a second sealing means arranged to form a longitudinally extending chamber outside of the receptacle supporting means extending along and sealed to the hood and wind box, and means normally closing the ends of said longitudinally extending chamber.

4. A sealing means for a continuous sintering apparatus comprising a series of pallets having longitudinally extending parallel sealing surfaces and wheel supports between said surfaces at each side of each pallet, a supporting and sealing bar engaging one of the surfaces below the wheels at each side of the pallet, a wind box having side plates air-tightly connected with said seal bars, an upper seal bar and means forming tunnel-like chambers airtightly connected to the upper seal bars and the side plates of said wind box and shaped to extend outside of and around the paths of said wheels.

5. The structure defined in claim 4 in which the means for forming said tunnel-like chamber includes members at each end thereof shaped to fit the contour of said wheels and each extending longitudinally sufficiently to simultaneously embrace two wheels at each side of the pallets.

6. A sintering machine including pallets having material supporting grates, a trackway along which the pallets may be moved and longitudinally extending sealing means carried by the pallets and coacting longitudinally extending sealing strips in fixed relation to the trackway, a hood extending over the grates at each side thereof and longitudinally along the trackway and having a sealing connection with said first-mentioned sealing means, a wind box below the grates having sealing connection with the pallet coacting sealing means, and a secondary sealing means extending longitudinally of and connected to the side walls of the hood and wind box, said secondary seal being so shaped as to form a tunnel-like chamber bridging over the movable sealing and supporting means at each side of each pallet.

7. In a sintering machine, longitudinally extending pallet supporting guideways, a plurality of pallets having supporting means at the sides thereof coacting with said guideways and permitting them to be moved in succession, slidable sealing members comprising coacting longitudinal surfaces on the guideways and on each side of the pallets, a wind box below the guideways having side walls sealed to the sealing members, a wind box hood above the lower wind box and having side walls provided with sliding sealing means coacting with the moving pallets, and an additional sealing means comprising longitudinally extending wall members extending along and bridging from the upper wind box side walls to the lower wind box side walls and positioned to permit the passage therethrough of the pallet supporting means.

8. A sintering machine having guideways for supporting moving pallets, a plurality of pallets and means for moving them in succession along the said guideways, an upper wind box hood and a lower wind box below the hood and below the guideways, the pallets having surfaces coacting with the guideways and forming a seal with the lower wind box, and parallel surfaces and sealing means in fixed relation to the side walls of the upper wind box hood, and additional sealing means comprising wall members shaped to form longitudinal chambers extending along the sides of the pallets and spaced therefrom and sealed to the side walls of the upper and lower wind boxes, and means at the ends of said longitudinal chambers closing them against passage of air while permitting the movement of the pallets along the same.

9. The sintering machine defined in claim 8 in which supporting wheels are mounted at each side of the pallets and in which the means closing the ends of the longitudinal chambers comprise longitudinally extending members having surfaces conforming to the contour of the wheels and closely fitting thereover as they move into and from said chambers.

10. The sintering machine defined in claim 8 in which return guideways including rails are provided for the pallets, and the pallets are provided with wheels at the sides thereof adapted to run on said rails, and in which the means closing the ends of the longitudinal chambers comprise spaced flexible partitions normally meeting but adapted to be separated by the passage of the wheels, there being a plurality of such partition members so spaced that only one is engaged by a wheel at any one time.

11. In a sintering machine having pallets provided with side walls and supporting means on said side walls, means to pass the pallets in a path in contacting succession, each of said pallets having at each side thereof a seal bar slidably coacting with the supporting means, a wind box hood above the pallets and having side walls extending downwardly and outside of the side walls of the pallets, a lower wind box having its side walls airtightly connected to said seal bars, and a longitudinally extending sealing means airtightly connected to said pallet seal bar and lower wind box and to the side walls of said hood and extending outside of said pallet supporting means.

12. The structure defined in claim 11 in which the pallets are provided with wheels at the sides thereof and in which said sealing means connecting the upper and lower wind box side walls extends outside of and around the path of the wheels.

13. The sintering machine defined in claim 11 in which the last-named sealing means comprises a longitudinal chamber having a plurality of flexible transverse closure members mounted within said chamber and so divided as to yield with the passing of the wheels and to close behind them.

14. The structure defined in claim 11 in which the longitudinally extending sealing means is in the form of a tunnel of non-collapsible material, and which is arranged to permit vertical movement between the inner edges of the upper and lower walls of the tunnel, said walls being airtightly connected to the sealing bars coacting with the shoulders on the pallets.

15. In a sintering machine having a plurality of pallets comprising grates and upwardly extending side walls and supporting wheels and having longitudinally extending parallel supporting and sealing shoulders at each side thereof and above and below the wheels, means for moving said pallets in a plane in contacting succession, longitudinally extending supports for the pallets having sealing surfaces engaging the supporting and sealing surface of the pallet, a wind box extending downwardly from said last-named supporting and sealing member and airtightly connected thereto, a chambered hood over the grates, a longitudinally extending sealing member between the hood and a sealing surface at each side of the pallet, an adjustable means for yieldingly supporting the weight of the hood member, said longitudinal members and shoulders constituting a primary seal between the hood and wind box and interposed pallets, secondary sealing members airtightly connected to the longitudinal sealing members and extending outwardly and around the path of the wheels at each side of the pallets and forming a chamber extending along the sides of the hood and wind box and sealed thereto, said chamber having closure means at each end permitting the wheels to enter and pass outwardly from the chamber while preventing the free passage of gas, said closure means being formed of self-supporting yieldable material permitting relatively vertical adjustment of the longitudinally extending seal bars.

16. In a sintering machine having pallets provided with side walls and supporting means, means to pass the pallets in a path in contacting succession, each of said pallets having at each side thereof a seal bar slidably coacting with the supporting means, a wind box hood above the pallets and having side walls extending downwardly to the side walls of the pallets, slidable sealing means between the wind box hood and the pallet side walls, a lower wind box air-tightly connected to said seal bars, and a longitudinally extending sealing means airtightly connected to said pallet seal bar and lower wind box and to the side walls of said hood and extending outside of said pallet supporting means.

17. The structure defined in claim 16 in which the slidable sealing means between the pallets and the wind box hood is positioned at the top of the pallet walls.

18. The structure defined in claim 16 in which the pallets are provided with wheels at the sides thereof, and in which said sealing means connecting the upper and lower wind box side walls extends outside of and around the path of the wheels.

19. A sintering machine having pallets provided with side walls, means to pass said pallets in a path, each of said pallets having at each side a seal bar and supporting means, a wind box hood above said pallets having side walls extending downwardly outside of said pallets and along the path thereof, an airtight connection between said seal bar and said hood side walls, and tunnel-like chamber-forming wall structures extending along and connected with the side walls of the hood, and each tunnel structure including an inwardly sloping plate positioned for sliding connection with said pallet walls.

References Cited in the file of this patent
UNITED STATES PATENTS

| Number | Name | Date |
|---|---|---|
| 1,199,962 | Borson | Oct. 3, 1916 |
| 1,308,864 | Reckard | July 8, 1919 |
| 1,491,778 | Stehli | Apr. 22, 1924 |
| 1,680,345 | Stehli | Aug. 14, 1928 |
| 1,774,135 | Fassotte | Aug. 26, 1930 |
| 1,810,313 | Hyde | June 16, 1931 |
| 2,254,323 | Shallock | Sept. 2, 1941 |
| 2,506,569 | Agnew | May 9, 1950 |
| 2,563,135 | Rowen | Aug. 7, 1951 |